(12) United States Patent
Moore

(10) Patent No.: US 6,704,860 B1
(45) Date of Patent: Mar. 9, 2004

(54) DATA PROCESSING SYSTEM AND METHOD FOR FETCHING INSTRUCTION BLOCKS IN RESPONSE TO A DETECTED BLOCK SEQUENCE

(75) Inventor: Charles Robert Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 09/626,249

(22) Filed: Jul. 26, 2000

(51) Int. Cl.[7] .............................. G06F 9/44; G06F 9/30; G06F 12/08
(52) U.S. Cl. ..................... 712/237; 712/230; 712/213; 711/221; 711/216; 711/213
(58) Field of Search ................................. 712/239, 234, 712/206, 207, 227, 235, 236, 240, 245, 237, 230, 213; 711/209, 213, 220, 221, 216

(56) References Cited

U.S. PATENT DOCUMENTS 5,515,519 A * 5/1996 Yoshioka et al. ............ 712/234
6,272,624 B1 * 8/2001 Giacalone et al. ........... 712/239

* cited by examiner

Primary Examiner—Daniel H. Pan
(74) Attorney, Agent, or Firm—Volel Emile; Bracewell & Patterson, L.L.P.

(57) ABSTRACT

A data processing system and method of fetching instructions in a data processing system are described. The data processing system includes at least one execution unit that executes fetched instructions and instruction sequencing logic that fetches instructions from memory. In response to detection of a particular instruction trigger within an instruction stream, the instruction sequencing logic fetches one or more non-sequential blocks of instructions from memory, where each of the non-sequential blocks includes a plurality of instructions.

23 Claims, 4 Drawing Sheets

DATA PROCESSING SYSTEM AND METHOD FOR FETCHING INSTRUCTION BLOCKS IN RESPONSE TO A DETECTED BLOCK SEQUENCE

BACKGROUND OF THE INVENTION

1. Technical Field

The present invention relates in general to data processing and, in particular, to a processor and method for fetching instructions. Still more particularly, the present invention relates to a processor and method for fetching blocks of instructions in response to a detected block sequence.

2. Description of the Related Art

A typical processor for a computer system comprises a digital integrated circuit including, for example, one or more execution units for executing sequential instructions, a branch unit for processing branch instructions, and registers for storing instruction operands and result data. The processor further includes an instruction cache for storing instructions and instruction sequencing logic for fetching instructions from the instruction cache and routing them to the various execution units for execution.

In a conventional processor, the instruction sequencing logic includes a sequential fetcher that, during each processor cycle, generates an effective address corresponding to a next cache line of instructions that sequentially follows the previously fetched cache line. For example, assuming the instruction cache has 8-byte cache lines, the sequential fetcher generates an effective address corresponding to a next sequential cache line by incrementing the previous effective address by 8. In the absence of a branch in program flow (e.g., due to a branch instruction), this effective address is translated into a real address and then supplied to the instruction cache to fetch the next sequential cache line of instructions.

In addition to such sequential fetching, the instruction sequencing logic may also fetch instructions non-sequentially. In particular, the branch unit may compute non-sequential branch target addresses in response to processing branch instructions in the instruction stream. Many processors also generate speculative non-sequential branch target addresses by predicting the outcome of conditional branch instructions. Such non-sequential branch target addresses are translated into real addresses and supplied to the instruction cache to fetch a next non-sequential cache line of instructions. Once fetched, the non-sequential instructions, which in cases of branch prediction may be speculative, can be executed by the processors execution units. Of course, processors that allow speculative execution of fetched instructions must also include some recovery mechanism in case the branch prediction is later determined to be incorrect.

For both sequential and non-sequential fetching, if the fetch address misses in the instruction cache, the requested instructions must be loaded from a lower level cache associated with the requesting processor, a cache associated with another processor, or main memory. If requested instructions cannot be loaded and supplied to the processor's execution units rapidly enough, the execution units of the processor may be idle for one or more cycles, thus degrading processor performance.

SUMMARY OF THE INVENTION

In view of the foregoing, instruction fetching becomes a more important performance consideration as processor clock frequencies increase since it is imperative, in order to exploit the full performance capability of a processor, for the processor's execution units to be supplied with instructions to execute. The conventional instruction fetching methodology described supra, which is referred to herein as instruction-level fetching, may not be able to provide an adequate supply of instructions for execution in some processor architectures because it is constrained to fetch a single cache line of instructions at a time. Thus, if a fetch request misses in the instruction cache, the processor may execute all previously fetched instructions prior to a next cache line of requested instructions being loaded from a lower level cache, for example.

Accordingly, the present invention provides an improved data processing system and method for fetching instructions. Rather than fetching only a single cache line of instructions in response to a generated fetch address, the processor of the present invention intelligently fetches one or more non-sequential blocks of instructions at a time from a memory. The present invention determines which blocks of instructions to fetch based upon hardware detection of a program's control flow graph (CFG), that is, the sequence in which the instruction blocks comprising the program are executed. If a portion of a previously observed sequence of instruction blocks is detected, one or more additional instruction blocks in the sequence are fetched. Thus, the instruction blocks following a currently executing instruction block will be available for rapid access by the processor.

In preferred embodiments, a data processing system implementing the present invention includes at least one execution unit that executes fetched instructions and instruction sequencing logic that fetches instructions from a memory. In response to detection of an instruction trigger within an instruction stream, the instruction sequencing logic fetches one or more non-sequential blocks of instructions from memory, where each of the non-sequential blocks includes a plurality of instructions.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
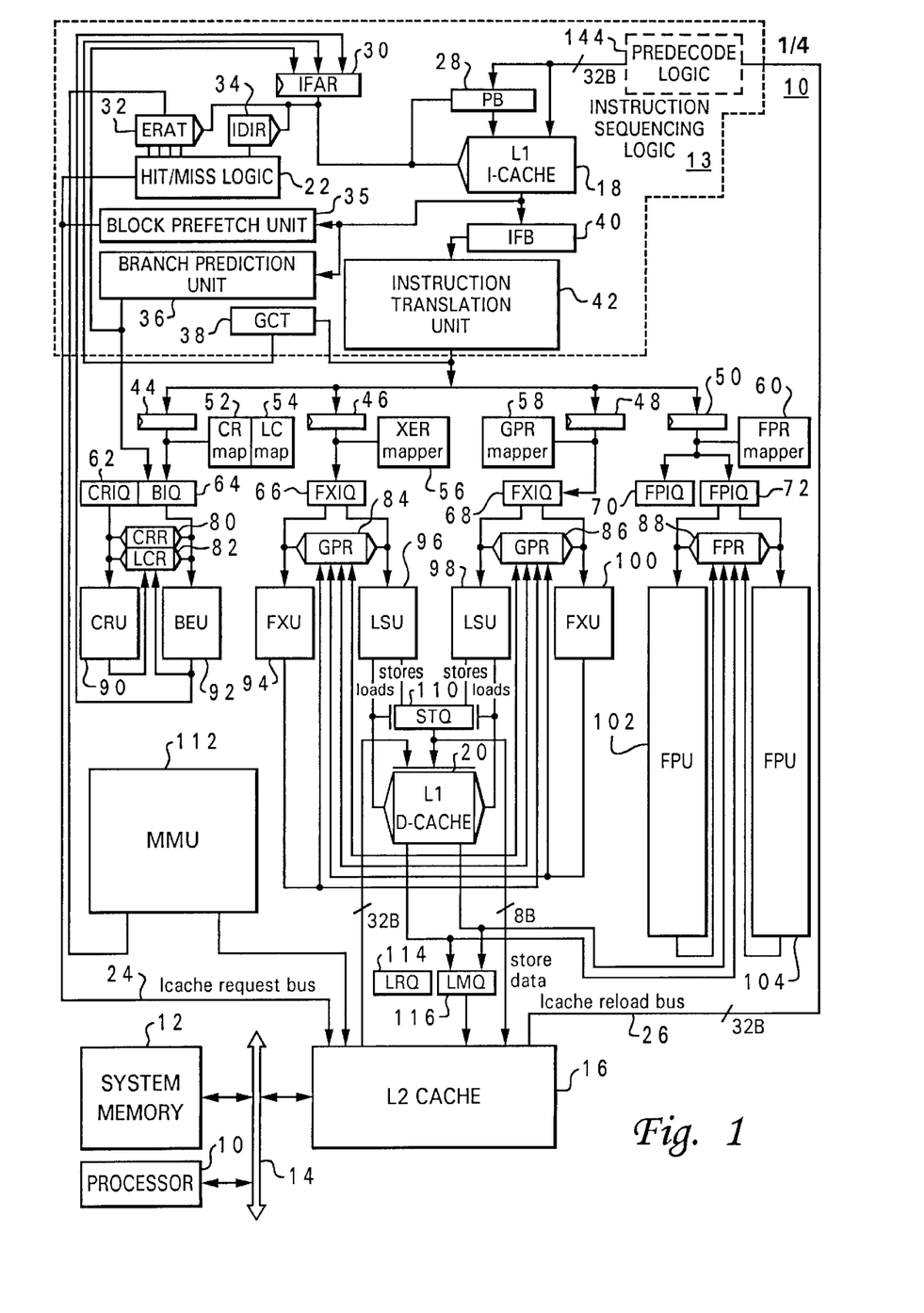
FIG. 1 depicts an illustrative embodiment of a data processing system with which the method and system of the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 implements an improved method of instruction fetching that detects a known sequence of instruction blocks and, in response to the detection, fetches one or more non-sequential blocks of instructions.

Processor Overview

Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, L1 caches 16 and 18 provide the lowest latency storage for cache lines corresponding to memory locations in system memory 12. L2 cache 16 provides storage for cache lines of instructions and data at a latency higher than L1 caches 16 and 18 but much lower than that of system memory 12 or the cache hierarchy of remote processor 10.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by these sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns or, as discussed in greater detail below, by block prefetch unit 35 in response to detection of a known sequence of instruction blocks. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to BPU 36, block prefetch unit 35, and instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92. IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Control Flow Graph

Superscalar processors, such as processor 10, have conventionally fetched and processed programs on an instruction-by-instruction basis. That is, processor architecture typically does not take into account program structure, but instead assumes that each program is merely a sequence of instructions to be executed sequentially, with occasional disruptions due to branches, interrupts, or other discontinuities in program flow.

Figure 2:
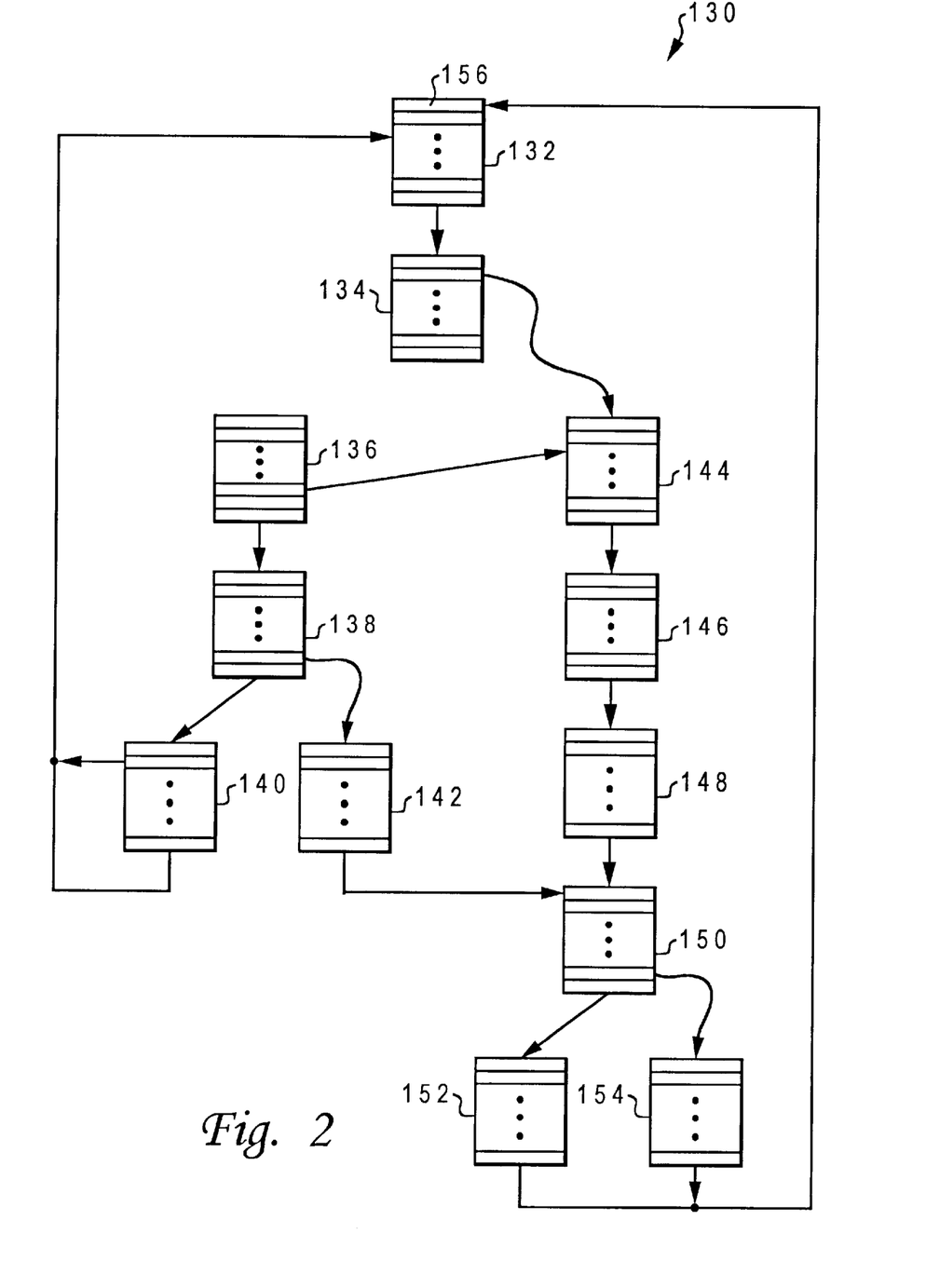
FIG. 2 illustrates an exemplary program including a plurality of instruction blocks.

In contrast to conventional superscalar processors, the architecture of processor 10, and in particular the design of instruction sequencing logic 13, reflects a recognition that nearly all programs have a higher level of organization or structure than the instruction level. Specifically, as shown in FIG. 2, an exemplary program 130 typically contains a plurality of instruction blocks 132–154, which each contain a logically contiguous group of UISA or IISA instructions 156. Each of instruction blocks 132–154 may represent a subroutine, function, program object, or the like. The order in which instruction blocks 132–154 are processed depends upon the control flow graph of the program (i.e., the control relationships linking instruction blocks), which is expressed as branch, jump or other instructions that direct a processor to process instructions non-sequentially. Depending upon the linking relationships defined by the CFG (represented by arrows in FIG. 2), each of instruction blocks 130–154 may be executed after one or more other instruction blocks 130–154 and may contain one or more exit points (i.e., instructions that are the last instructions executed prior to execution of an instruction in a next instruction block) and one or more entry points (i.e., instructions that are first executed in the instruction block following execution of a previous instruction block). Program 130 of FIG. 2 exhibits a looping structure typical of many commercial software applications.

Block Prefetch Unit

Figure 3:
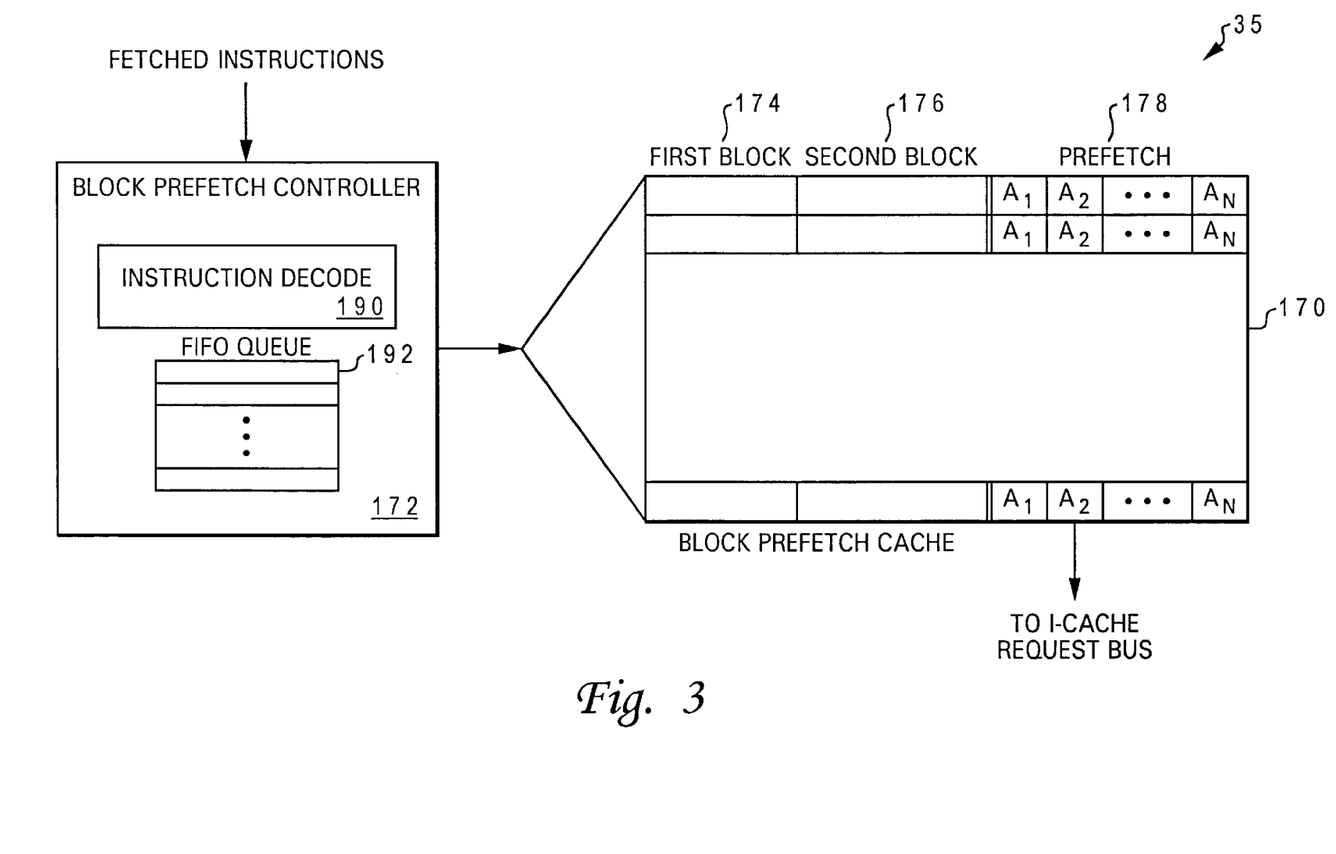
FIG. 3 is a more detailed block diagram of the block prefetch unit of FIG. 1.

With reference now to FIG. 3, there is illustrated a more detailed block diagram of an exemplary embodiment of block prefetch unit 35 of FIG. 1, which reduces the average access latency of requested instructions by detecting the CFG of a program and prefetching one or more instruction blocks accordingly. As utilized herein, "prefetching" is defined as loading instructions from a higher latency memory into a lower latency memory, where the relative latencies are measured with respect to the execution resources of a particular processor. "Fetching" as utilized herein is defined to include both the notion of "prefetching" as defined above, as well as the traditional concept of retrieving instructions into a processor's instruction buffer for subsequent execution by the processor's execution circuitry.

As depicted in FIG. 3, block prefetch unit 35 includes a block prefetch cache 170 coupled to a block prefetch controller 172 that controls read and write access to block prefetch cache 170. Block prefetch cache 170 contains a plurality of entries that each contain a first block field 174, a second block field 176 and a prefetch field 178. The first and second block fields 176 and 178 within each occupied entry hold the base addresses of instruction blocks that are executed one immediately after the other within the current program. Prefetch field 178 contains N (where N≧1 and is preferably ≧2) base addresses of instruction blocks that have been observed to be executed following the sequence of instruction blocks indicated by the associated first and second block fields 176 and 178. Thus, first and second block fields 176 and 178 record a partial block sequence that can be recognized as a preface to the longer block sequence recorded in prefetch field 178.

Block prefetch controller 172 includes an instruction decoder 190 that scans each cache line fetched from L1 I-cache 18 for an instruction "trigger" marking the beginning (or end) of an instruction block. Instruction triggers that can be employed include special no-operation (no-op) instructions inserted by a compiler or predecode logic 144 to facilitate recognition of instruction blocks and yet maintain binary compatibility. In addition, instruction triggers can include preambles to subroutine calls such as a pairing of the "branch conditional and link" and "branch conditional to link" instructions in the PowerPC instruction set described in *PowerPC Microprocessor Family: The Programming Environments for 64-Bit Microprocessors*, which is available from Motorola, Inc. of Schaumburg, Ill., and incorporated herein by reference. The instruction trigger or triggers detected by the instruction decoder 190 may further include any operating-system-defined linkage convention or any other discontinuity in the instruction stream provided to IFB 40. Base addresses of instruction blocks detected by instruction decoder 190 are placed, in order of detection, into a first-in, first-out (FIFO) queue 192.

Figure 4:
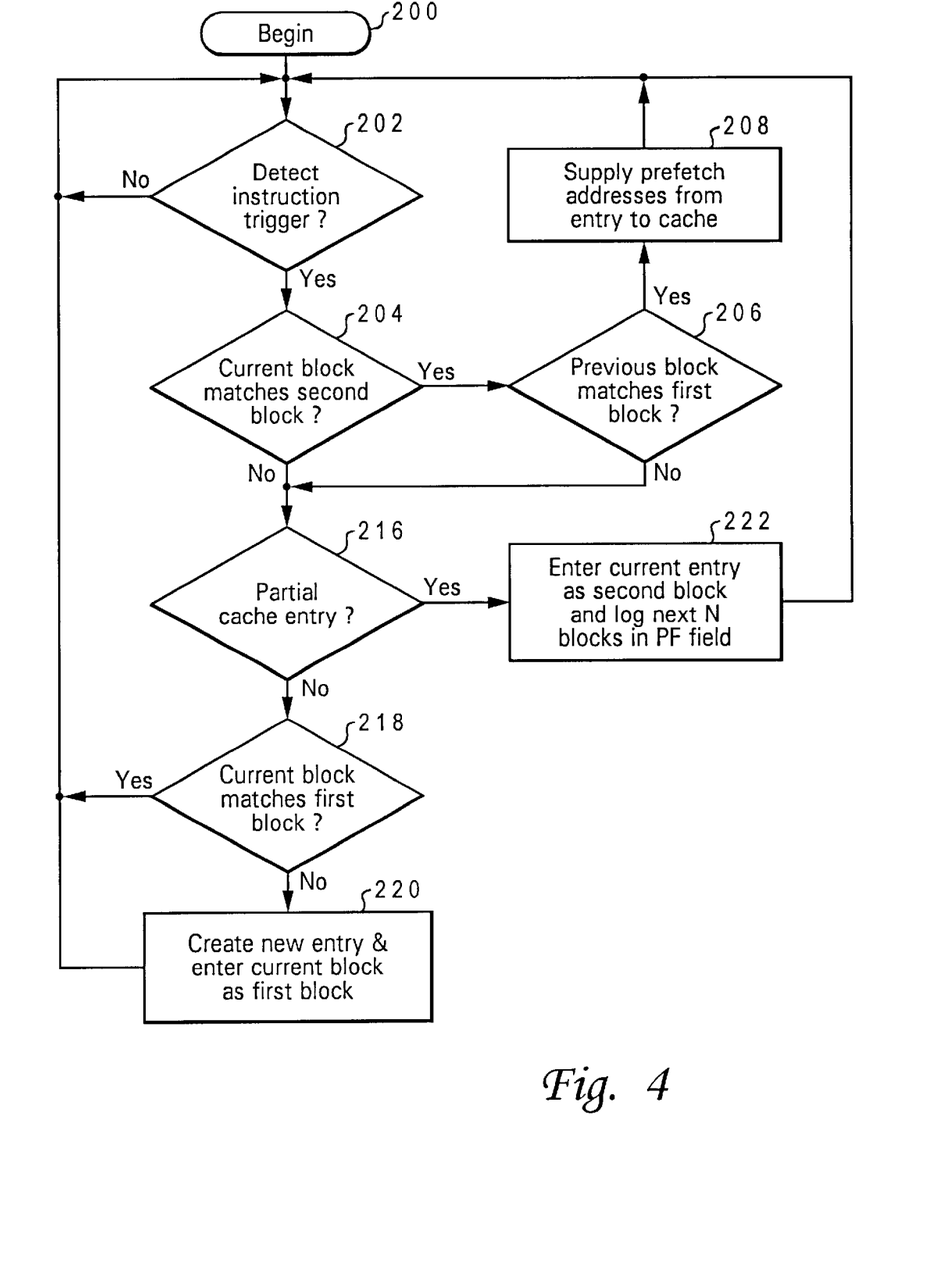
FIG. 4 is a high level logical flowchart of an exemplary method of operation of the block prefetch unit depicted in FIG. 3.

Referring now to FIG. 4, there is illustrated a high level logical flowchart of the operation of block prefetch controller 172 in accordance with preferred embodiments of the present invention. The illustrated method operation is preferably implemented by state machine circuitry in block prefetch controller 172.

Instruction Prefetching

As depicted in FIG. 4, the process begins at block 200 and thereafter proceeds to block 202, which illustrates instruction decoder 190 scanning a cache line of instructions fetched from L1 I-cache 18 to determine whether or not the cache line includes an instruction trigger. If not, the process simply iterates at block 202 until an instruction trigger is detected.

In response to instruction decoder 190 detecting an instruction trigger in the cache line, block prefetch controller 172 buffers the base address of the instruction block associated with the instruction trigger (hereinafter, referred to as the current instruction block) in FIFO queue 192 and then determines at blocks 204 and 206 whether or not the current instruction block is a member of a previously detected sequence of instruction blocks cached within block prefetch cache 170. This determination is made by first determining at 20 block 204 whether or not the base address of the current instruction block matches a base address recorded in any of second block fields 176. If so, a further determination is made at block 206 whether the base address of the immediately previous instruction block (which is buffered in FIFO queue 192) matches the base address recorded in first block field 174 of any of the potentially matching entries identified at block 204. If both the determinations illustrated at blocks 204 and 206 are answered affirmatively, block prefetch controller 172 directs block prefetch cache 170 to output the instruction block addresses in prefetch field 178 of the matching entry on I-cache request bus 24 to trigger speculative prefetching of one or more (and up to all) cache lines of instructions within the instruction blocks from L2 cache 16 into L1 I-cache 18. In this manner, if the prefetched instruction blocks are subsequently requested from L1 I-cache 18 via IFAR 30, the access latency of these instruction blocks will be reduced as compared with conventional fetching since the process of loading the instruction blocks into L1 I-cache 18 will have already begun.

If, on the other hand, either of the determinations depicted at blocks 204 and 206 are negative, an entry in block prefetch cache 170 is created and/or filled as depicted at blocks 216–222. While those skilled in the art will appreciate that various cache management policies can be employed to achieve efficient operation of block prefetch cache 170, the exemplary process illustrated in FIG. 4 creates a new entry in prefetch cache 170 each time a unique sequence of two instruction blocks is detected. Because this management policy may lead to an unacceptably large number of partially redundant entries (i.e., entries storing overlapping sequences of instruction blocks), additional logic may be employed to search block prefetch cache 170 for partially redundant entries and merge such entries.

Referring now to block 216, block prefetch controller 172 determines whether a partial cache entry having only its first block field 174 filled exists, for example, in a buffer of block prefetch controller 172 or in block prefetch cache 170. If so, meaning that a cache entry was created in response to detection of the previous instruction block as discussed below with respect to block 220, the base address of the current instruction block is entered into second block field 176 of the partial cache entry, and the base addresses of the next N instruction blocks are logged in prefetch field 178 of the cache entry. If the partial cache entry is maintained in a buffer, the entry is also written to block prefetch cache 170. Thereafter, the process returns from block 222 to block 202, which has been described.

If, however, a determination is made at block 216 that no partial cache entry exists, block prefetch controller 172 determines at block 218 whether or not the base address of the current instruction block matches the contents of any of first block fields 174. If so, the process returns to block 202 to await a determination at block 204 whether there is a match between the current instruction block sequence and a previously detected instruction block sequence. Returning to block 218, if block prefetch controller 172 determines that the base address of the current instruction block does not match the addresses in any of first block fields 174, then a new cache entry is created at block 220, and the base address of the current instruction block is entered in first block field 174. Of course, if block prefetch cache 178 is full of valid entries, a conventional replacement scheme such as one of the well-known least recently used (LRU), random, or pseudo-random replacement schemes can be utilized to create room in block prefetch cache 178 to store the newly created cache entry.

The performance benefit obtained by the present invention can easily be seen, for example, by reference to the exemplary program illustrated in FIG. 3. When program 130 begins execution, processor 10 may execute (in order) instruction blocks 132, 134, 144, 146, 148, 150 and 154. According to the process illustrated in FIG. 4, this execution scenario would lead to the creation of six entries in block prefetch cache 170 that respectively detect the following pairs of instruction blocks [132,134], [134,144], [144,146], [146,148], [148,150], [150,154]. Thus, when the execution flow loops back to instruction block 132, when the instruction trigger associated with instruction block 134 is detected, instruction blocks 144, 146 and 148 will be prefetched into L1 I-cache 18.

If instruction blocks 132, 134, 144, 146, 148, 150, and 154 are again executed, the instruction latency for these instruction blocks will be decreased as compared with the prior art because the instructions within each instruction block will already be present in L1 I-cache 18 when requested by the sequential fetcher. Of course, instruction flow may not proceed from instruction block 134 to instruction block 144, but may instead proceed to instruction block 136. In that case, block prefetch controller 172 can halt prefetching of instructions in instruction blocks 144, 146 and 148 (if prefetching of these instructions is still ongoing) in response to a simple comparison of the sequence of instruction blocks in FIFO queue 192 and the prefetch sequence in the relevant prefetch field 178. However, even if the execution sequence of instruction blocks is not exactly the same when program 130 loops back to the beginning, instruction fetch latency is no worse than if instruction prefetching were not implemented. In addition, instruction fetch latency will be improved if there is even a partial repetition of a previous sequence of instruction blocks (e.g., instruction blocks 132, 134, 136, 144, 146, 148, 150 and 152).

It should also be noted that further performance benefits can be obtained if the cache hierarchy of processor 10 is designed to recognize and discard redundant or unnecessary prefetch addresses. For example, hit/miss logic 22 can check prefetch addresses against cache directory 34 of L1 I-cache 18 and discard those prefetch addresses that hit in L1 I-cache 18 prior to supplying the prefetch addresses to L2 cache 16. Alternatively, L2 cache 16 can be designed to record the inclusivity of cache lines (i.e., which cache lines are also stored in L1 I-cache 18) and discard prefetch addresses that hit L2 cache entries having set inclusivity bits. In addition, L2 cache 16 preferably detects redundant prefetch requests so that redundant requests for instructions are not sourced on interconnect fabric 14.

As has been described, the present invention provides an improved processor and method of fetching instructions that detect an execution sequence of a plurality of instruction blocks and, in response to the detection of the sequence, fetches one or more subsequent instruction blocks.

While the invention has been particularly shown and described with reference to a preferred embodiment, it will be understood by those skilled in the art that various changes in form and detail may be made therein without departing from the spirit and scope of the invention.

What is claimed is:

1. A method of processing instructions comprising:
   storing, within a block fetch cache, a plurality of entries, each entry including (1) a plurality of base addresses each associated with a respective one of a plurality of non-sequential blocks of instructions and (2) a key for accessing the entry, said key being associated with a respective instruction;
   receiving an instruction stream;
   in response to detecting a particular instruction within the instruction stream, said particular instruction having a particular key associated therewith:
      accessing an entry within said block prefetch cache having a key matching the particular key associated with said particular instruction to obtain from the entry a plurality of base addresses of a plurality of non-sequential blocks of instructions; and
      fetching the plurality of non-sequential blocks of instructions from memory utilizing said plurality of base addresses, wherein each of the plurality of non-sequential blocks includes a plurality of instructions.

2. The method of claim 1, wherein said plurality of non-sequential blocks of instructions forms a block sequence, and wherein each block sequence has a different respective associated key.

3. The method of claim 1, wherein the key comprises an instruction address.

4. The method of claim 1, wherein said particular instruction comprises a no-operation (no-op) instruction.

5. The method of claim 1, wherein said particular instruction comprises a non-sequential instruction.

6. The method of claim 1, and further comprising generating at least one fetch addresses to fetch instructions within one of said plurality of non-sequential blocks by adding an offset to a previous fetch address.

7. The method of claim 1, wherein said fetching comprises fetching said plurality of non-sequential blocks of instructions from a lower level memory and storing said plurality of non-sequential blocks of instructions into a higher level memory without placing at least one of said plurality of non-sequential blocks of instructions within an execution pipeline of a processor.

8. The method of claim 1, wherein:
   said particular instruction is a second instruction;
   said method further comprising detecting for a first instruction in the instruction stream; and
   said fetching is performed in response to said second instruction only if said first instruction is detected in said instruction stream prior to said second instruction.

9. A data processing system, comprising:
   means for storing a plurality of entries, each entry including (1) a plurality of base addresses each associated with a respective one of a plurality of non-sequential blocks of instructions and (2) a key for accessing the entry, said key being associated with a respective instruction;
   means for receiving an instruction stream;
   means, responsive to detecting a particular instruction within the instruction stream, said particular instruction having a particular key associated therewith, for accessing an entry having a key matching the particular key associated with said particular instruction to obtain from the entry a plurality of base addresses of a plurality of non-sequential blocks of instructions;
   means for fetching the plurality of non-sequential blocks of instructions from memory utilizing said plurality of base addresses, wherein each of the plurality of non-sequential blocks includes a plurality of instructions; and
   means for executing at least some fetched instructions.

10. The data processing system of claim 9, wherein said plurality of non-sequential blocks of instructions forms a block sequence, and wherein each block sequence has a different respective associated key.

11. The data processing system of claim 9, wherein the key comprises an instruction address.

12. The data processing system of claim 9, wherein said particular instruction comprises a no-operation (no-op) instruction.

13. The data processing system of claim 9, wherein said particular instruction comprises a non-sequential instruction.

14. The data processing system of claim 9, and further comprising means for generating at least one fetch address to fetch instructions within one of said plurality of non-sequential blocks by adding an offset to a previous fetch address.

15. The data processing system of claim 9, wherein said means for fetching comprises means for fetching said plurality of non-sequential blocks of instructions from a lower level memory and for storing said plurality of non-sequential blocks of instructions into a higher level memory without placing at least one of said plurality of non-sequential blocks of instructions within an execution pipeline of said means for executing.

16. The data processing system of claim 9, wherein:
   said particular instruction is a second instruction;
   said data processing system further comprises means for detecting for a first instruction in the instruction stream; and
   said means for fetching fetches said plurality of non-sequential blocks of instructions in response to said second instruction only if said first instruction is detected in said instruction stream prior to said second instruction.

17. A data processing system, comprising:

a block fetch cache containing a plurality of entries, each entry including (1) a plurality of base addresses each associated with a respective one of a plurality of non-sequential blocks of instructions and (2) a key for accessing the entry, said key being associated with a respective instruction;

instruction sequencing logic that, responsive to detecting a particular instruction fetched from memory, said particular instruction having a particular key associated therewith, accesses an entry within said block prefetch cache having a key matching the particular key associated with said particular instruction to obtain from the entry a plurality of base addresses of a plurality of non-sequential blocks of instructions and fetches the plurality of non-sequential blocks of instructions from memory utilizing the plurality of base addresses, wherein each of the plurality of non-sequential blocks includes a plurality of instructions; and at least one execution unit that executes at least some fetched instructions.

18. The data processing system of claim 17, wherein the key comprises an instruction address.

19. The data processing system of claim 17, wherein said particular instruction comprises a no-operation (no-op) instruction.

20. The data processing system of claim 17, wherein said particular instruction comprises a non-sequential instruction.

21. The data processing system of claim 17, and further comprising a sequential fetcher including an adder that generates at least one fetch address to fetch instructions within one of said plurality of non-sequential blocks by adding an offset to a previous fetch address.

22. The data processing system of claim 17, wherein said memory is a lower level memory, said data processing system further comprising an instruction cache, wherein said instruction sequencing logic fetches said plurality of non-sequential blocks of instructions from the lower level memory such that said plurality of non-sequential blocks of instructions are stored into said instruction cache without placing at least one of said plurality of non-sequential blocks of instructions within an execution pipeline of said at least one execution unit.

23. The data processing system of claim 17, wherein:

said particular instruction is a second instruction;

said instruction sequencing logic comprises means for detecting for a first instruction in the instruction stream; and said instruction sequencing logic fetches said plurality of non-sequential blocks of instructions in response to said second instruction only if said first instruction is detected in said instruction stream prior to said second instruction.

\* \* \* \* \*